United States Patent [19]
Ishida et al.

[11] 3,925,415
[45] Dec. 9, 1975

[54] METHOD FOR MANUFACTURE OF NOVEL COMPOUNDS

[75] Inventors: Torao Ishida; Junichi Ohoishi, both of Shizuoka, Japan; Kouichi Yoshida, Cleveland, Ohio; Kageyasu Akashi, Shizuoka, Japan; Isao Takeda, deceased, late of Tokyo, Japan; by Emiko Takeda, legal representative, Osaka, Japan

[73] Assignee: Asahi Kasei Kogyo Kabushiki Kaisha, Osaka, Japan

[22] Filed: May 6, 1974

[21] Appl. No.: 467,468

[30] Foreign Application Priority Data
May 9, 1973  Japan.................................. 48-50658

[52] U.S. Cl................................. 260/335; 424/278

[51] Int. Cl.$^2$....................................... C07D 311/86
[58] Field of Search..................................... 260/335

[56] References Cited
OTHER PUBLICATIONS
L. F. Fieser, et al., Reagents for Organic Synthesis, pp. 256–257.

*Primary Examiner*—Norma S. Milestone
*Attorney, Agent, or Firm*—Cooper, Dunham, Clark, Griffin & Moran

[57] ABSTRACT

Di-(2'-tetrahydrofuranyl)-secalonic acid D or di-(2'-tetrahydropyranyl)-secalonic acid D is active as an anti-tumor agent for mice. It is produced by reaction of secalonic acid with 2,3-dihydrofuran or 2,3-dihydro-4H-pyran in the presence of an acidic catalyst.

2 Claims, 4 Drawing Figures

METHOD FOR MANUFACTURE OF NOVEL COMPOUNDS

This invention relates to novel compounds useful in combatting tumors in mice and to a method for the manufacture of the compounds. More particularly, the present invention is concerned with di-(2'-tetrahydrofuranyl)- or di-(2'-tetrahydropyranyl)-secalonic acid D which is obtained by the reaction of secalonic acid, a product of *Penicillium oxalicum* (B. S. Stein: "Tetrahedron," Vol. 26, page 51, 1970), with 2,3-dihydrofuran or 2,3-dihydro-4H-pyran in the presence of an acidic catalyst.

Mice are sometimes seized with malignant tumors such as leukemia, ascitic tumor and various solid tumors and these are often fatal. This invention provides agents for combating malignant tumors, particularly ascitic tumor, which attack mice.

Di-(2'-tetrahydrofuranyl)-secalonic acid D and di-(2'-tetrahydropyanyl-secalonic acid D have the structural formulas set forth below as Formulas (I) and (II) respectively. They do not have definite melting points.

Di-(2'-tetrahydrofuranyl)-secalonic acid D:

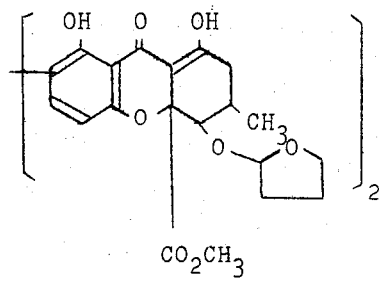

(I)

Di-(2'-tetrahydropyranyl)-secalonic acid D:

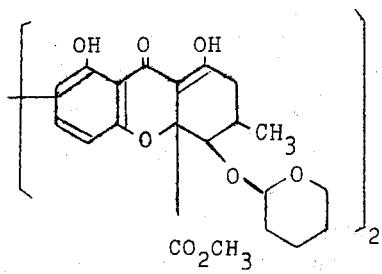

(II)

Figure 1:
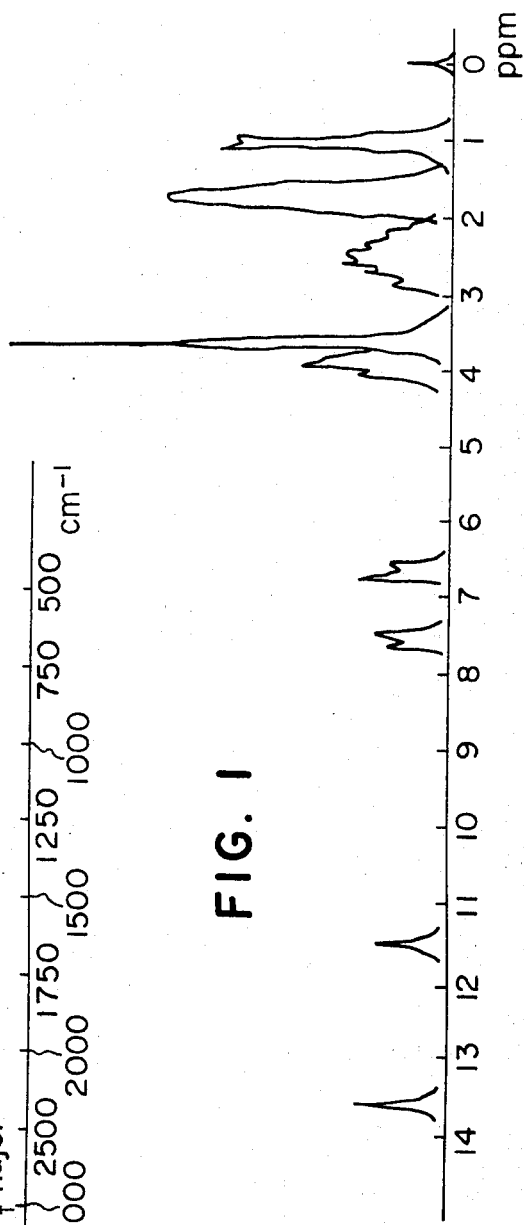
Figure 2:
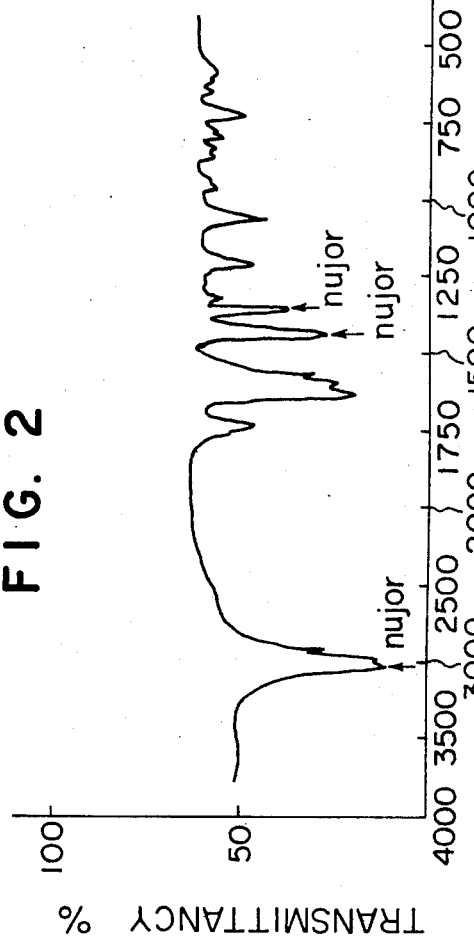
Figure 4:
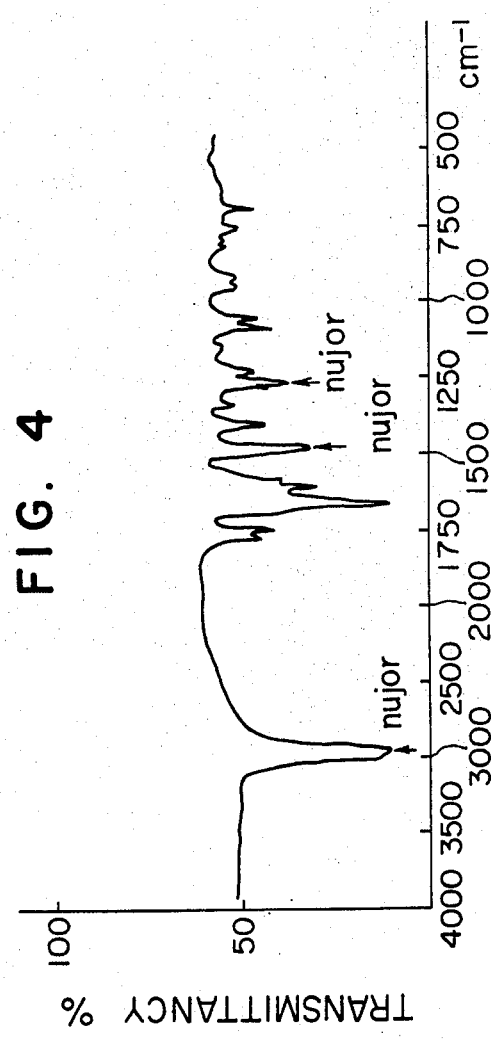
Figure 3:
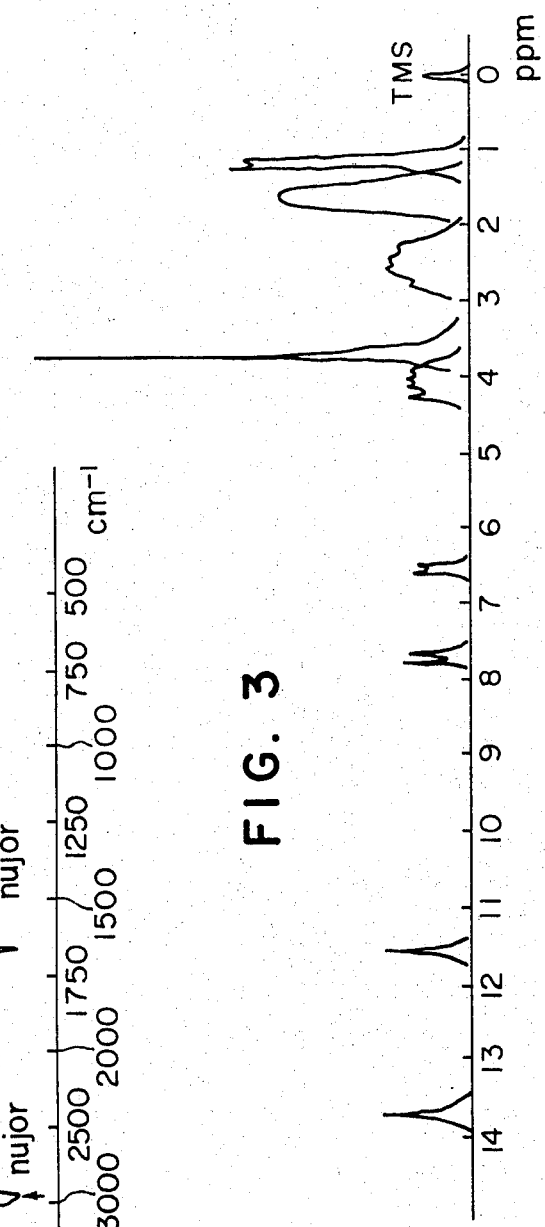

FIG. 1 and FIG. 2 represent a NMR spectrum and an infrared absorption spectrum respectively of di-(2'-tetrahydrofuranyl)-secalonic acid D, and FIG. 3 and FIG. 4 represent those respectively of di-(2'-tetrahydropyranyl)-secalonic acid D.

Di-(2'-tetrahydrofuranyl)-secalonic acid D and di-(2'-tetrahydropyranyl)-secalonic acid D were tested for toxicity and for anti-tumor activity. The controls were secalonic acid D and 5-fluorouracil (5-FU) and Mitomycin C (MMC) which are known as anti-tumor agents for mice. The results of the tests are shown in Tables 1 and 2 below.

Table 1

| Substance tested | $LD_{50}$ (in mg/kg) |
| --- | --- |
| Controls: | |
| Secalonic acid D | 40 |
| MMC | 20 |
| 5-FU | 500 |
| (1) | 400 |
| (2) | 500 |
| None | — |

Table 2

| Substance used | Dosage* | Life prolongation ratio |
| --- | --- | --- |
| Controls: | | |
| Secalonic acid D | 7 | 145 |
| MMC | 7 | 310 |
| 5-FU | 20 | 130 |
| (1) | 20 | 330 |
| (2) | 20 | 300 |
| None | — | 100 |

*mg/kg of body weight × one dose/day × 5 days
(1) Di-(2'-tetrahydrofuranyl)-secalonic acid D
(2) Di-(2'-tetrahydropyranyl)-secalonic acid D Acute toxicity ($LD_{50}$): The test substance was injected into the abdominal cavities of mice to determine the dose which would be fatal to 50% of the mice under test. This dose is reported in terms of weight per kg of the body weight of mice.

Anti-tumor activity: To mice having Ehrlich ascites carcinoma, a given test substance prepared to the optimum concentration (20 mg per kg. of the body weight of mice in the case of the compounds of this invention; compared with 7 mg for secalonic acid and MMC and 30 mg for 5-FU as controls) was injected once a day for a period of 5 days. The anti-tumor activity was rated in terms of life prolongation ratio (%) determined 60 days after the period of injection.

The compounds, di-(2'-tetrahydrofuranyl)-secalonic acid D and di-(2'-tetrahydropyranyl)-secalonic acid D were found to be three times as effective against Ehrlich ascites carcinoma in mice as no treatment at all. In this respect, the compounds were equal to MMC and excelled 5-FU. Although MMC is active against tumors in mice, it is disadvantageous in that it reduces their immunity so that they readily contract other diseases. In contrast to MMC, the substances of this invention actually enhance the immunity of mice.

The immunity of a test mice is rates in terms of the change in the number of antibody (19S and 7S) producing cells in the spleen determined seven days after termination of medication with the test substance. Generally, the immunity increases with the increasing number of antibody-producing cells in the spleen.

The test for immunity was carried out on (1) di-(2'-tetrahydrofuranyl)-secalonic acid D and (2) di-(2'-tetrahydropyranyl)-secalonic acid D utilizing MMC as the control. The results are shown in Table 3.

Table 3

| Substance tested | Dosage | Number of antibody-producing cells | |
| --- | --- | --- | --- |
| | | 19S | 7S |
| Control (MMC) | 2 mg/kg | $4 \times 10^3$ | $2 \times 10^4$ |
| (1) | 5 mg/kg | $15 \times 10^4$ | $7 \times 10^5$ |
| (2) | 5 mg/kg | $20 \times 10^4$ | $9 \times 10^5$ |
| None | — | $3 \times 10^4$ | $2 \times 10^5$ |

From the results, it is clear that the substances of this invention increased the immunity to about five times of the level existing with mice to which no test substance was administered, whereas MMC conversely lowered the immunity to about one-tenth of said level.

The compounds of this invention are obtained by the reaction of secalonic acid D with 2,3-dihydrofuran and 2,3-dihydro-4H-pyran in the presence of an acidic catalyst. Acidic catalysts including mineral acids such as hydrochloric acid and sulfuric acid and organic acids such as p-toluene-sulfonic acid and benzenesulfonic acid can be used. Solvents are not essential since 2,3-dihydrofuran and 2,3-dihydro-4H-pyran are both liquids. The reaction will take place at normal room temperature. Better results of reaction are obtained in a shorter period of time, however, when the reaction is carried out under reflux (55°C for 2,3-dihydrofuran and 80°C for 2,3-dihydro-4H-pyran).

The reaction is terminated by neutralizing or alkalinizing the reaction system with the addition of an alkali. Di-(2'-tetrahydrofuranyl)-secalonic acid D or di-(2'-tetrahydropyranyl)-secalonic acid D which are formed in the reaction systems are then isolated and purified by any of a number of standard procedures including, for example chromatography and recrystallization.

The following nonlimiting examples are given by way of illustration only.

EXAMPLE 1

One g of secalonic acid D was thoroughly dried and then finely divided in a mortar. The resulting crystalline particles were suspended in 25 ml of freshly distilled 2,3-dihydrofuran. The resulting system was mixed with 0.1 ml of concentrated hydrochloric acid with vigorous agitation, and thereafter refluxed over an oil bath at 55° – 56°C. In about 1 hour, the secalonic acid D was completely dissolved. The system was heated for another hour and then cooled. The reaction solution was admixed with about 50 ml of ether, transferred to a separation funnel and combined with 50 ml of an aqueous 5% sodium bicarbonate solution to neutralize the hydrochloric acid. The ether phase was washed five times with water, separated from the reaction system and dried over anhydrous sodium sulfate which was removed by filtration. The filtrate was distilled under reduced pressure to remove ether and excess 2,3-dihydrofuran. Consequently, there was obtained 1.2 g of di-(2'-tetrahydrofuranyl)-seecalonic acid D in the form of a yellow powder. The crystalline powder was dissolved in cyclohexane at its boiling temperature and recrystallized by cooling. The recrystallization produced 0.8 g of crystals of di-(tetrahydrofuranyl)-secalonic acid D. The crystalline product having a molecular formula of $C_{40}H_{42}O_{16}$ had a molecular weight of 778 (found) compared with 778 (calculated) and an elementary analysis, C(%), H(%) and O(%), of 61.9, 5.3 and 32.7 (found) compared with 61.7, 5.4 and 32.9 (calculated). This compound gradually melted, but did not show any definite melting point.

EXAMPLE 2

Five g of thoroughly dried secalonic acid D was suspended in 100 ml of 2,3-dihydro-4H-pyran at room temperature. The system was admixed with 10 mg of p-toluenesulfonic acid and, while under vigorous agitation, refluxed at 80°C for 5 hours. During this treatment, the secalonic acid D gradually dissolved. At the end of the 5 hours of reflux, the system was cooled to room temperature. The reaction system was admixed with 100 ml of ether and then swirled rapidly with 100 ml of an aqueous 1% sodium bicarbonate solution, so that it was separated into a neutralized aqueous phase and an ether phase. The ether phase was dried over 10 g of anhydrous sodium sulfate. The product was recovered as in Example 1 to provide 6.1 g of di-(2'-tetrahydropyranyl)-secalonic acid D in the form of a yellow solid. By dissolving and recrystallizing this solid product with the minimum quantity of cyclohexane at its boiling temperature and cooling, there were obtained 5.0 g of crystals of di-(2'-tetrahydropyranyl)secalonic acid D. The crystalline product having a molecular formula of $C_{42}H_{46}O_{16}$ had a molecular weight of 806 (found) compared with 806 (calculated) and an elementary analysis, C(%), H(%) and O(%), of 62.7, 5.8 and 31.4 (found) compared with 62.5, 5.7 and 31.8 (calculated). This compound was gradually melted, but showed no definite melting point.

EXAMPLE 3

In 25 ml each of freshly distilled 2,3-dihydrofuran and 2,3-dihydro-4H-pyran, 1.0 g of thoroughly dried crystals of secalonic acid D was suspended. Each system was thoroughly mixed by agitation with about 5 mg of benzenesulfonic acid and thereafter refluxed over a heated oil bath. In about 1 hour, the secalonic acid D dissolved. The reaction was stopped in 1.5 hours. Each reaction solution was admixed with 50 ml of ether and 50 ml of an aqueous 5% sodium bicarbonate solution to remove the acid catalyst. From each system, the ether phase was separated, dried over anhydrous sodium sulfate. The products were recovered as described in Example 1 and purified by dissolving in about 10 cc of benzene and standing in the presence of added hexane until just before the formation of crystals. Consequently, there were obtained 0.8 g of di-(2'-tetrahydrofranyl)-secalonic acid D and 1.1 g of di-(2'-tetrahydropyranyl)-secalonic acid D. The elementary analyses are shown in Table 4.

Table 4

|  | Tetrahydrofuranyl derivative | | | Tetrahydropyranyl derivative | | |
|---|---|---|---|---|---|---|
| Molecular formula | $C_{40}H_{42}O_{16}$ | | | $C_{42}H_{46}O_{16}$ | | |
| Molecular weight | 778 | | | 806 | | |
| Elementary analysis: | C(%) | H(%) | O(%) | C(%) | H(%) | O(%) |
| Calculated | 61.7 | 5.4 | 32.9 | 62.5 | 5.7 | 31.8 |
| Found | 61.9 | 5.3 | 32.8 | 62.7 | 5.7 | 31.6 |

What is claimed is:

1. A compound having the formula:

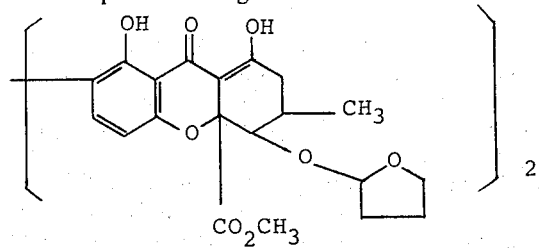

2. A compound having the formula:

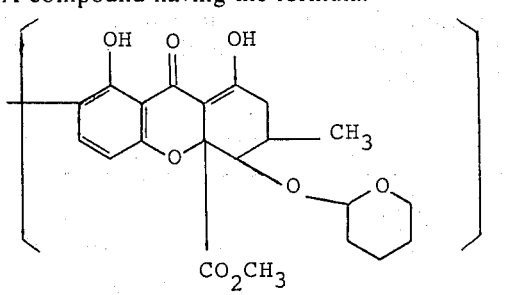

* * * * *